United States Patent [19]

Bigley et al.

[11] 4,284,942

[45] Aug. 18, 1981

[54] LOAD DRIVING APPARATUS

[75] Inventors: William J. Bigley, Scotch Plains; Vincent J. Rizzo, Basking Ridge, both of N.J.

[73] Assignee: Lockheed Electronics Co., Inc., Plainfield, N.J.

[21] Appl. No.: 916,138

[22] Filed: Jun. 16, 1978

Related U.S. Application Data

[63] Continuation-in-part of Ser. No. 866,394, Jan. 6, 1978.

[51] Int. Cl.³ ............................................... G05B 5/01
[52] U.S. Cl. .................................... 318/618; 318/615; 318/619; 318/620; 318/332; 318/307; 91/359
[58] Field of Search ............... 318/615, 616, 618, 619, 318/623, 332, 307, 620; 91/359, 361

[56] References Cited

U.S. PATENT DOCUMENTS

| 2,472,271 | 6/1949 | Yardeny | 318/623 |
| 3,464,318 | 9/1969 | Thayer et al. | 91/359 |
| 3,660,744 | 5/1972 | Plummer | 318/618 |
| 3,665,278 | 5/1972 | Kazmarek | 318/615 |
| 3,808,486 | 4/1974 | Cuda et al. | 318/619 |
| 3,826,961 | 7/1974 | Hayase et al. | 318/332 |

*Primary Examiner*—J. V. Truhe
*Assistant Examiner*—Eugene S. Indyk
*Attorney, Agent, or Firm*—Stephen B. Judlowe

[57] ABSTRACT

Load actuating servomechanism apparatus includes dynamic regeneration and a mechanically damped motor-load coupling to equalize and overcome a frequency-varying load/load drive train mechanical resonance. The drive circuitry comprises a per se conventional primary motor speed controlling rate feedback loop including a cascaded rate signal command source, summing error-signal producing node, and loop frequency response shaping filter and driver amplifier for exciting a load driving motor, and a rate tachometer signal feedback element connecting a measure of the motor output speed to a subtractive input of the summing node.

To broaden the response band of the primary feedback circuit and accommodate a mechanical resonance otherwise interfering therewith, a secondary, positive feedback path supplements the input rate command with a signal dependent upon motor current, and thus upon motor load. Accordingly, output load drive automatically increases as motor current increases when a load drive retarding mechanical resonance is encountered. Further, the mechanical damping, for example implemented by a slip clutch, lowers the effective Q of the resonance, thereby facilitating load actuation.

7 Claims, 3 Drawing Figures

LOAD DRIVING APPARATUS

This application is a continuation-in-part of co-pending application Ser. No. 866,394, the disclosure of which is incorporated herein by reference.

The present invention relates generally to control systems, and more particularly to a servomechanism control system which compensated for and overcomes mechanical self-resonance.

As disclosed in said co-pending application, the band width of a convention servo control system is sometimes limited by mechanical load/load coupling resonance. Such self-resonance is particularly likely to occur between the mechanical coupling which transfers drive energy from the servo motor to the load. At the portion of the system response at which self-resonance occurs, it becomes difficult for the motor to drive the load to a desired position and/or at a desired rate, since the output energy of the motor to a large degree, is being absorbed by the resonance of the coupling elements rather than being coupled or transmitted to the load.

The system disclosed is said co-pending application solves this basic mechanical resonance problem by providing a secondary feedback path, in addition to the basic rate-control feedback path between the motor and the drive control circuit. This second, positive feedback path provides a supplemental signal additive with respect to the input rate command which varies with the motor current which, in turn, varies with the motor load. That is, since the apparent load on the motor increases at the condition of resonance, there is a corresponding increase in the motor current at this state of system operation. The increased supplemental signal is thus effective to automatically increase the motor drive to the load when load-coupling mechanical resonance is encountered.

This arrangement of said co-pending application successfully overcomes the deleterious effects of mechanical resonance and effectively broadens the system bandwidth. There are, however, systems in which motors and couplings are utilized in which the compensation provided by this secondary feedback loop is insufficient to completely overcome the losses in energy transmission introduced by the mechanical self-resonance—primarily as a result of the inability of the motor to provide the needed additional output to overcome the losses caused by the resonance even when supplemental drive current is provided to the motor by the supplemental feedback loop (motor limitation or saturation). Although this may be corrected by employing a heavier duty motor, the cost and size of such motors would make them unsuitable or uneconomic for some automatic control systems.

Thus, in these control systems, the compensation provided by the supplemental feedback loop may be insufficient to completely overcome the losses caused by mechanical resonance and thus achieve the desired system bandwidth.

It is, therefore, an object of the invention to provide an improved automatic load control system.

It is another object of the invention to provide a load control system that effectively corrects for the effects of mechanical self-resonance in conventional automatic control systems.

It is a further object of the invention to provide a load control system of the type described, which is effective to correct the effects of mechanical self-resonance even in systems in which the motor output is limited.

To these ends, the control system of the invention includes a mechanical damping element connected between the driving motor and the driven load. In the embodiment of the invention herein described, the mechanical damping element is in the form of a slip clutch, which transmits motor torque to the load linearly within a certain range of motor output torque but, when the torque exceeds a prescribed value, slips and thereafter provides a substantially constant slip torque irrespective of further increases in motor output torque. It has been found that the introduction of such a damping element reduces the motor output energy absorbed by the mechanical resonance of the system, and particularly, when combined with the supplemental feedback loop described in said co-pending application, the mechanical damping element coupled to the motor is effective to significantly broaden the effective bandwidth of the system beyond the resonance frequency.

To the accomplishment of the above and such further objects as may hereinafter appear, the present invention relates to a load control system, substantially as defined in the appended claims, and as described in the following detailed specification, as considered in conjunction with the accompanying drawing in which:

Figure 1:
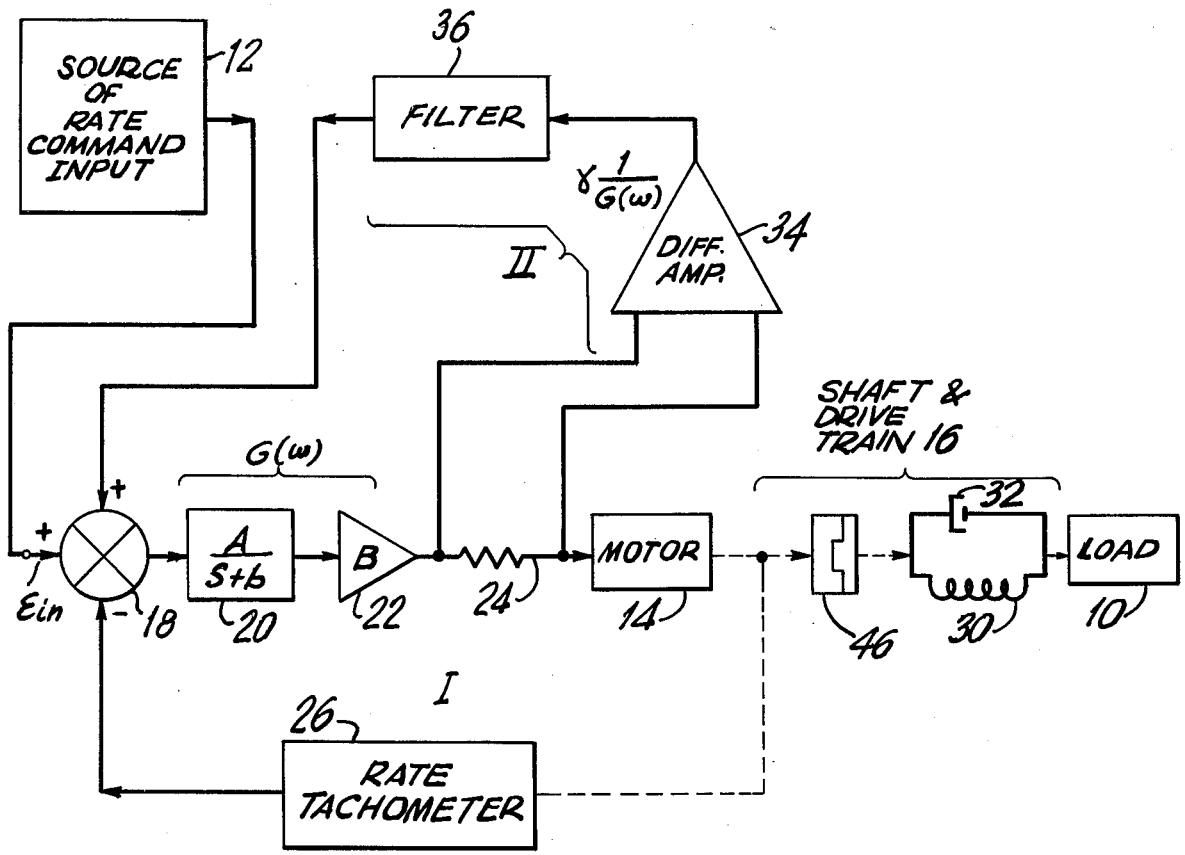
FIG. 1 is a schematic block diagram of an electrical load control system in accordance with one embodiment of the present invention.

Referring now to FIG. 1, there is shown a multi-loop rate servomechanism arrangement for controlling the speed of a driven load 10 in accordance with an input rate command signal $E_{in}$ supplied by a rate command source 12. The actuation (e.g., rotation) of load 10 is effected by a motor 14 having its output drive shaft connected to the load 10 via a shaft and/or drive train coupling 16, which may be of any form and construction. This arrangement comprises a primary motor 14 rate controlling feedback loop I which is per se conventional, and which employs an actuation path for the motor 14 from the input source 12 via a linear summing element (node) 18 (e.g., an operational amplifier) and a forward gain frequency response shaping filter-driver of composite frequency response $G(\omega)$. The forward gain-shaping function 20 may, as shown, comprise an active or passive low pass filter ("lag" network) of a conventional transform $A/s+b$ followed by a driver amplifier 22 of gain B, the output of which is coupled to the motor 14 through a motor current-sensing resistor 24 whose function is described in greater detail below.

As is also conventional, the feedback path of the primary loop I includes a rate tachometer 26 having an input which senses the instantaneous rotational speed of the motor output shaft ($\dot{\theta}$), and which supplies an electrical signal proportional to the motor shaft rate to the subtractive input of the summing node 18.

Since primary rate controlling servo loop I, except for the resistor 24, is conventional, it is only briefly considered here. The rate command source 12 supplies a time varying signal $E_{in}(t)$ specifying a desired rotational rate for the load. This signal is compared with the instantaneous shaft rate ($\dot{\theta}$) signal developed by the rate tachometer 26, and any difference ("error") signal produced by the summing node 18 is applied to the input of the forward gain elements 20 and 22. The output of the forward gain elements, which is present at the output port of the driver amplifier 22, is then applied as a driving signal to the motor 14. At steady state, and assuming a sufficient frequency response capability for the motor 14, the primary loop I operates to automatically eliminate or minimize the error at the output of summing node 18, thus constraining the output shaft rate of motor 12 to follow the proscribed value $E_{in}(t)$. For frequencies well within the open-loop system response band, the system does work in this manner to effect such load driving control.

However, the output shaft of motor 14 is, as shown, conventionally connected to the load 10 by the shaft/drive train coupling 16 that may be represented by a spring factor 30 in parallel with a molecular friction element 32. The spring 30 represents shaft and drive train resilience, backlash and the like, whereas the schematic dash pot 32 symbolizes internal molecular friction. The representation 30-32 and the analysis of same is also well known for mechanical motion treatment.

The difficulty with the prior art rate servos of the primary (sole loop I) type is the self-resonance that is exhibited by the mechanical elements of the coupling 16 at a typically non-fixed resonance frequency that is determined by the mechanical parameters of the coupling elements, and which often depends as well upon system handling. At this resonance frequency of the elements 30, 32 and the load 10, the output motion and energy developed by the motor 14 are absorbed in the effective resonating elements, rather than being passed through the mechanical coupling to drive the load 10, thereby materially reducing the band width of the system response.

In an attempt to reduce or eliminate this problem, a second positive or regenerative feedback path II may be provided, as described in said co-pending application, to provide compensation for the losses produced by the resonance. In this compensated system, the instantaneous drive current consumed by the motor 14 is sensed by the current-monitoring resistance 24 connected intermediate the motor driving amplifier 22 and the energy receiving port of the motor 14. The current signal across resistance 24 is buffered and converted to single-ended form relative to ground for convenience in a differential amplifier 34, and passes through a path II feedback filter 36 to an additive input port of the summing node 18. The transfer function of the composite feedback path II is advantageously $\gamma (1/G(\omega))$, i.e., a factor $\gamma$ (a positive number between zero and unity) advantageously multiplied by the inverse of the forward gain filter function $G(\omega)$. This provides speedy response with stability.

In the operation of the supplementary, regenerative feedback path II, when a resonance zone in the mechanical coupling is encountered in response to a rapidly changing input command $E_{in}(t)$, the increased motor current sensed across resistor 24 passes through difference amplifier 34 and filter 36, thereby furnishing an increased potential at the upper, additive input of summing node 18. This augments the rate command signal $E_{in}(t)$, thereby automatically applying an increased drive at resonance to the motor 14 and supplementing the motor output torque applied to the coupling 16 and load 10. As the scaling function $\gamma$ approaches unity, nearly complete equalization occurs for the coupling resonance in most control systems, such that the composite closed loop (I) response of the system extends through and beyond the resonance area. For most applications, the closed-loop response for a composite servo-mechanism that includes the supplementary feedback circuit II may be significantly extended depending upon the low-pass filter, the open loop gain, and the current-torque characteristics of the motor.

Figure 2:
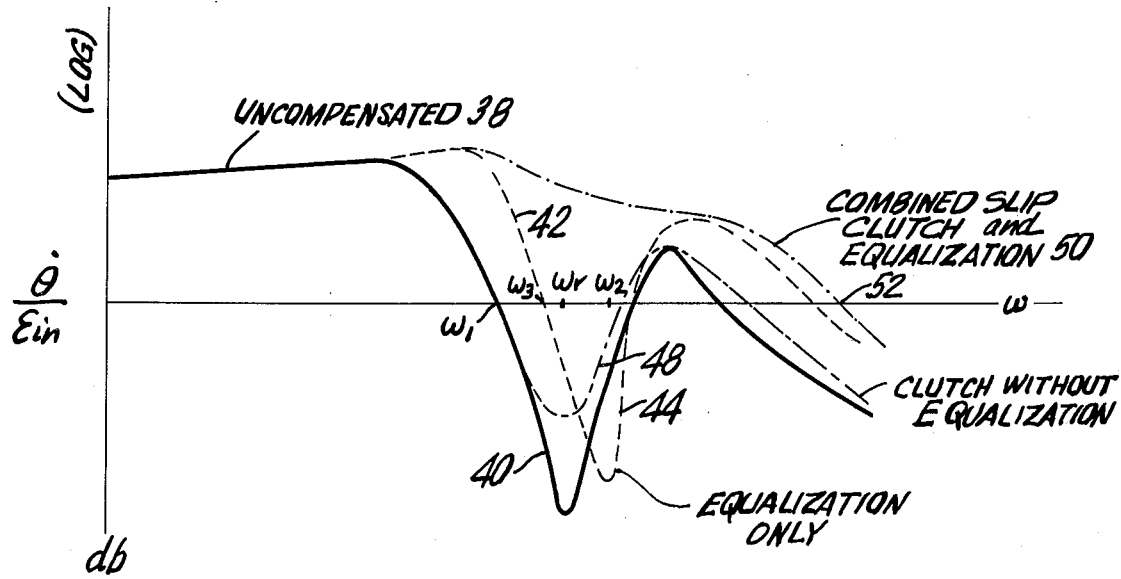
FIG. 2 is a representation of the loop response of several control systems as compared to the loop response achieved by the control system of the invention.

The effects of the mechanical resonance of the motor-load coupling without the compensation provided by the supplementary feedback loop II is shown in FIG. 2 by the closed loop response curve 38. A fully operable closed loop response 65 is shown for the equalized system in our said co-pending application.

Thus, curve 38 is a typical closed-loop response of an uncompensated system, which has a zone 40 at which mechanical self-resonance in the coupling elements occurs, such that in this zone, the motor output drive is absorbed by the resonance and the load can no longer efficiently follow the input signal command. The resonance at curve zone 40, centered at frequency $\omega_r$, limits conventional rate feedback loops (without loop II equalization) to driving signal frequencies below the resonance frequency area, and in particular to frequencies appreciably below $\omega_1$ at which the uncompensated open-loop response 38 crosses unity gain. The resonance zone 40 is not fixed in frequency value, since the effective drive shaft coupling parameters may change, as with input signal level and with loading. Thus, for example, the effective coupling spring factor (element 30) is dependent upon backlash which, in turn, depends upon the level of the applied input rate signal variations reflected in the signal $E_{in}(t)$.

With the introduction of the supplemental feedback loop II, upon the occurrence of the resonant zone 40, the motor current, as previously noted, increases. This increased current is sensed to develop a correcting signal which is fed back through amplifier 34 and filter 36 to the summing node at which it acts to further increase the drive to the motor 14, such that the motor produces a greater output in the resonance region. As noted, in many systems this compensation is sufficient to achieve the desired improved closed-loop bandwidth. However, in other systems the supplemental current applied to the motor may cause the motor output torque to reach a value beyond which any additional increase in the motor drive current provided by the equalization (compensation) signal will not give rise to any corresponding increase in the motor output torque. This limiting or saturation condition occurs at the limit of motor 14 (or amplifier 22) capacity. Thus, although the provision of the supplemental loop II in such saturation systems does provide increased output at the onset of mechanical resonance, it may, in these systems not be sufficient to completely correct the system response for the effects of resonance, such that the system bandwidth will remain insufficient for certain high-speed applications.

This limiting or saturating situation is shown at curve 42, which illustrates the closed-loop response of a system that includes a supplementary loop II such as shown in FIG. 1, having a factor $\gamma=0.8$. As shown in FIG. 2, the response 42 has a zone of diminished output at region 44, which is centered about at a frequency $\omega_2$ that is higher than the frequency $\omega_r$ of mechanical resonance, such that the usable bandwidth of the system is beneficially increased vis-a-vis no equalization.

However, the unity gain crossover frequence has increased from $\omega_1$ to $\omega_3$; because of the limitations in the motor output alluded to above, the compensated response of curve 42 still exhibits at zone 44, a reduced, less than unity gain response caused by the self-resonance of the coupling elements.

It will thus be appreciated that in certain rate control systems of the type shown in FIG. 1, the inclusion of the supplemental feedback loop II may still be ineffective to bring about the desired servo bandwidth operation because of mechanical self-resonance, such that the system would still be frequency limited in operation.

In accordance with the present invention, the limitations produced on the system response by this mechanical self-resonance is further and completely corrected by the provision of a mechanical damping element, here shown as a slip clutch 46, mechanically interposed between the motor 14 and the mechanical coupling 30, as shown in FIG. 1. A slip clutch, per se well known, has the property of transmitting torque in a substantially linear relationship (output torque/input torque) to a load over a predetermined range of input torques until the input torque reaches a predetermined level. After that input torque level is reached, the clutch will slip and will not transmit additional torque to the load even with an increase in the torque applied to the slip clutch.

A mechanical damping element, such as a slip clutch, connected in series with the coupling elements of the drive train 16, may be considered in an electrical analog as constituting a resistance loading for parallel resonant circuit made up of the inductance of the spring 30 and the capacitance of the load inertia 10. As in the analog electrical resonant circuit, the effect of the mechanical damping (resistance) provided by the slip clutch is to lower the effective Q of the mechanical resonant circuit and thereby reduce the losses caused by the occurrence of mechanical resonance.

The effect of the incorporation of the slip-clutch 46 in series with the load drive couping in FIG. 1 (but without loop II equalization) is illustrated by curve 48 in FIG. 2. Thus, as shown by curve 48, the response of the uncompensated loop I system including a mechanical damping slip clutch connected to the motor and coupling shows reduced losses at resonance. By selecting a clutch 46 that slips at a level of increased motor torque occurring at resonance, the overall deleterious resonance impact upon the response of the system is less pronounced, and is centered at the same rate of frequence ($\omega_r$) at which mechanical resonance occurs in the conventional system without such damping, as shown by curve 38.

When the mechanical damping provided by the clip clutch 48 is combined with the equalization provided by the feedback loop II, it has been found that the overall open loop response of the system remains above unity gain at rates exceeding the mechanical resonance zone of the system. The open-loop response for the overall system of FIG. 1, which includes the equalizing feedback loop II and the mechanical damping element-slip clutch 46 connected between the motor and the load, is shown by curve 50 in FIG. 2 which, as shown, extends the loop response to a frequency unity gain break point 52.

Accordingly, the composite load control system of the present invention results in a broad-band system, which operates at an improved frequency response and provides load control at higher rates of load movement.

Figure 3:
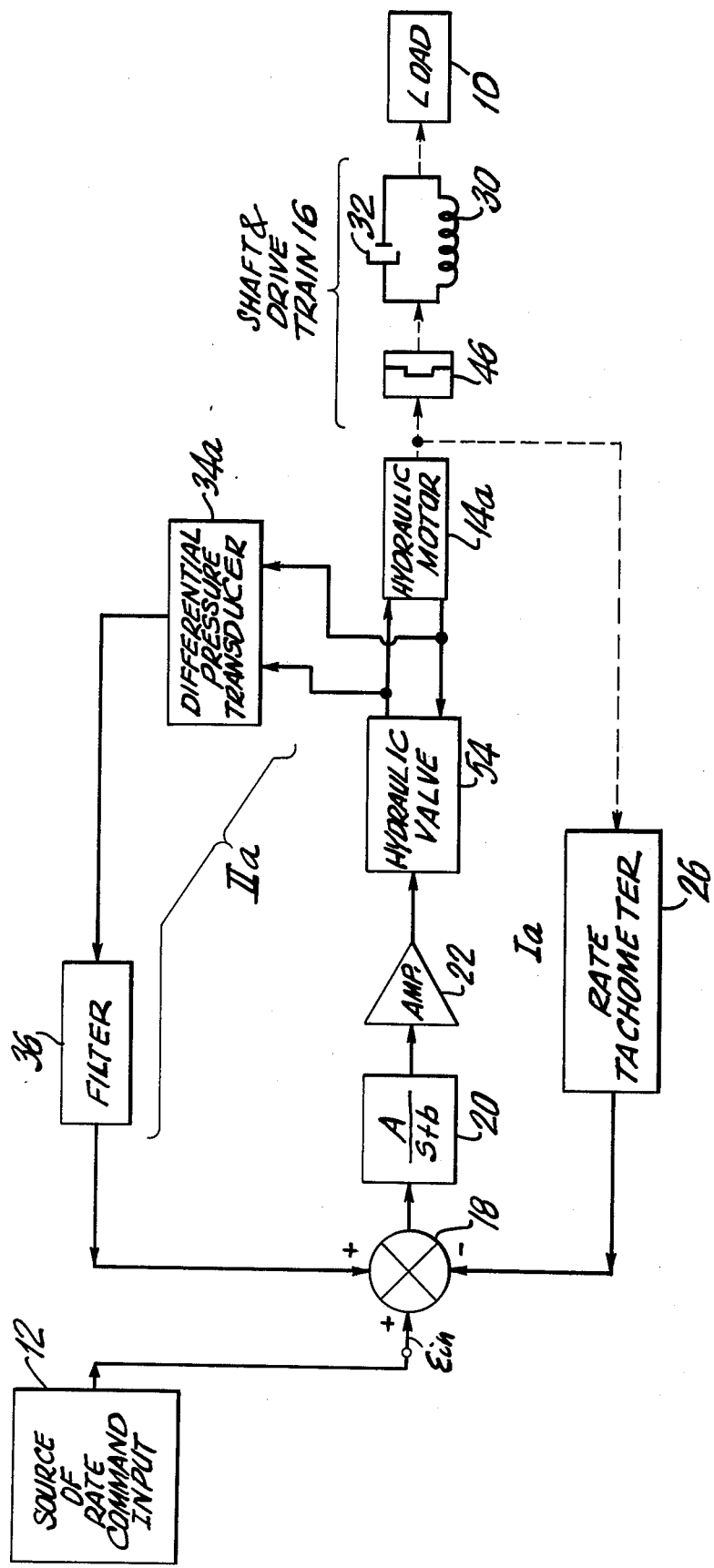
FIG. 3 is a schematic block diagram of a hydraulic control system that incorporates the principles of the invention shown in FIG. 1.

The control system of the invention may also be used to advantage in a hydraulic control system, as shown in FIG. 3, in which elements corresponding to those of the system of FIG. 1 are given by like reference numerals and analogous functioning elements identified by corresponding reference numerals, with the subscript "a" appended thereto. As shown, the system of FIG. 3 includes a hydraulic motor 14a which drives a load 10 through a coupling 16, in which the components 10, 30, 32 exhibit mechanical resonance at a certain rate of system operation.

The hydraulic motor 14a receives operating hydraulic fluid at a controlled rate from a hydraulic valve 54 which, in turn, receives a control signal from the output of amplifier 22. The input to the amplifier 22 is the error signal produced at the output of the summing mode or comparator 18 as passed through the low-pass filter 20. The error signal produced by the comparator is the sum of a rate control signal $E_{in}$ received from the rate control source 12 and a signal derived from the supplemental feedback loop IIa, minus the rate signal provided at the minus point of the comparator from the rate tachometer 26 mechanically coupled to the output of motor 14.

The supplemental compensating feedback loop IIa comprises a differential pressure transducer 34a that is coupled to the output lines of the hydraulic valve 54, such that the transducer senses the pressure of the hydraulic fluid—(corresponding to the current in the embodiment of FIG. 1) being supplied to the hydraulic motor to operate the motor. Transducer 34a, in turn, provides the equalizing signal to the second plus (additive) port of comparator 18.

As in the first embodiment described with reference to FIGS. 1 and 2, a mechanical damping element in the form of a slip clutch 46 is mechanically interposed between the motor and the load to further compensate for the effects of the mechanical resonance in the manner described previously, to broaden the closed-loop response of the system and thereby increase the maximum rate of the load.

The above arrangement is merely illustrative of the principles of the present invention. Numerous modifications and adaptations thereof will be readily apparent to those skilled in the art without departing from the spirit and scope of the present invention. Thus, for example, the present invention may be employed, as shown, in conjunction with other types of actuators; as well as for linear and rotational motor and the like.

What is claimed is:

1. In combination in servomechanism apparatus for driving a load via coupling means characterized by a mechanical resonance at rates exceeding said resonance, summing means having first and second additive input ports, a subtractive input port and an output, a motor, a load, output coupling means characterized by a mechanical resonance connecting said motor and said load, first network means connecting said output of said summing means and said motor, first negative feedback means having an output connected to said subtractive input port of said summing means and an input responsive to said motor, drive monitoring means for monitoring the drive consumed by said motor, second network positive feedback means having an input connected to said drive monitoring means and an output connected to said first additive input port of said summing means for increasing the energization applied to said motor when said monitoring means senses an increasing drive consumed by said motor to thereby overcome said mechanical resonance of said coupling means, and slip clutch means serially connected with said output coupling means for obviating excessive loading of said motor.

2. A combination as in claim 1 further comprising a motor command signal source connected to said second input of said summing means.

3. A combination as in claim 1 wherein said second and first network means have a transfer function ratio $\gamma$, where $\gamma$ is a positive number not exceeding one.

4. A combination as in claim 1 wherein said first feedback means comprises a tachometer.

5. A combination as in claim 1 wherein said motor comprises an electrical motor, and wherein said monitoring means comprises a resistance serially connected to said motor, and amplifier means connected to said resistance.

6. A combination as in claim 1 wherein said motor comprises a hydraulic motor, and wherein said monitoring means includes a differential pressure transducer.

7. In combination in servomechanism apparatus for driving a load via coupling means characterized by a mechanical resonance at rates exceeding said resonance, summing means having first and second additive input ports, a subtractive input port and an output, a hydraulic motor, a load, output coupling means characterized by a mechanical resonance connecting said motor and said load, first network means connecting said output of said summing means and said motor, first negative feedback means having an output connected to said subtractive input port of said summing means and an input responsive to said motor, drive monitoring means comprising a differential pressure transducer for monitoring the drive consumed by said hydraulic motor, second network positive feedback means having an input connected to said drive monitoring means and an input connected to said first additive input port of said summing means for increasing the energization applied to said motor when said monitoring means senses an increased drive consumed by said hydraulic motor to thereby overcome said mechanical resonance of said output coupling means.

* * * * *

UNITED STATES PATENT AND TRADEMARK OFFICE
CERTIFICATE OF CORRECTION

PATENT NO. : 4,284,942
DATED : August 18, 1981
INVENTOR(S) : William J. Bigley et al.

It is certified that error appears in the above—identified patent and that said Letters Patent is hereby corrected as shown below:

Claim 7, Column 8, line 14, "input" should read -- output --.

Signed and Sealed this

Thirteenth Day of October 1981

[SEAL]

Attest:

GERALD J. MOSSINGHOFF

Attesting Officer

Commissioner of Patents and Trademarks